Patented Apr. 11, 1944

2,346,440

UNITED STATES PATENT OFFICE 2,346,440

METHOD OF IMPROVING THE ADHESION OF RUBBER TO FIBROUS MATERIALS AND PRODUCT THEREOF

Edward T. Lessig, Silver Lake, and Edward N. Cunningham, Cuyahoga Falls, Ohio, assignors to The B. F. Goodrich Company, New York, N. Y., a corporation of New York No Drawing. Application July 3, 1941, Serial No. 400,964

16 Claims. (Cl. 154—2)

This invention relates to the manufacture of composite products comprising rubber and fibrous materials in adhering relation and is particularly concerned with improving the adhesion of rubber to fibrous materials such as cotton, ramie, silk, artificial silk, glass, or the like in the form of cords, fabrics, and similar fibrous structures.

In the present day manufacture of certain rubber goods which are to be subjected to severe service conditions it has been found desirable to incorporate cords, fabrics, and similar fibrous materials with the rubber in order to give added strength to withstand the severe service. Because of the reinforcing action of these fibrous materials the length of useful service of the rubber goods is to a considerable extent dependent upon the degree of adhesion that is obtained between the rubber and the fibers. If the adhesion is slight the rubber will separate from the fiber at the rubber-fiber interface when the composite structure is subjected to loads. This will cause increased heat generation, the propagation of tears, and general breakdown of the entire article. It is accordingly the object of this invention to provide a method whereby improvement in adhesion between rubber and fibrous reinforcing elements may be obtained and to provide superior composite products embodying rubber and fibrous reinforcing elements in strongly adhering relation.

We have discovered that adhesion of fibrous materials to rubber may be improved by making a composite product comprising the fibrous material surrounded by a layer of rubber containing an aromatic mercaptan, which is known also as a thiophenol, or an aromatic sulfide, also called a thioether. These adhesion promoting materials all contain a

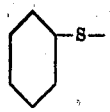

group with the extra valence bond on the sulfur being satisfied by a hydrogen, to form a mercaptan, or by an aromatic group, to form the sulfide. The coated fibrous materials are imbedded in rubber to make up the composite fiber-reinforced product. This layer of rubber containing the adhesion promoting materials is preferably much thinner than the remainder of the rubber in the composite product. It is not understood precisely how the chemicals containing the

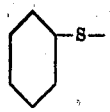

group promote the adhesion of fibrous materials to rubber but measurements of the force necessary to rupture the fibrous material-rubber bond show that they do have such an effect.

The adhesion promoting materials used in this invention have the structural formula Ar—S—R wherein Ar is an aryl group and R is either a hydrogen or an aromatic group. The aromatic groups may contain any of the ordinary substituents but for best results it is preferred that the substituents contain only carbon and hydrogen alkyl, aryl, and aralkyl radicals. The aryl groups (Ar) may be phenyl, tolyl, xylyl, biphenyl, naphthyl, methyl, or a higher aromatic group containing substituents if desired. Included in the list of compounds which may be used in this invention are phenyl mercaptan, tolyl mercaptan, xylyl mercaptan, mesityl mercaptan, biphenyl mercaptan, naphthyl mercaptan, diphenyl sulfide, ditolyl sulfide, phenyl tolyl sulfide, and their corresponding substituted compounds. There are, of course, many other compounds of similar nature that may be used in this invention with equally beneficial results. In the composite product made according to this invention the layer of rubber next to the fibrous material and which contains the adhesion promoting material preferably should be considerably thinner than the remainder of the rubber in the product. In general this thin layer will be from about 0.02 inch to not more than 0.20 inch thick.

In practicing this invention a fibrous material, such as a tire cord, is preferably dipped into a cement comprising rubber containing either an aryl mercaptan, an aryl sulfide, or a mixture of both, and a solvent. Substantially all the solvent is evaporated and the cord is embedded in a vulcanizable rubber composition and the rubber is vulcanized. The rubber cement may also contain vulcanizing materials but this is not necessary as there will usually be sufficient migration of vulcanizing material from the adjacent rubber to effect vulcanization of the thin layer next to the cord. A typical cement for use in this invention is one containing 10% by weight of the cement of milled smoked sheet rubber, 0.5% by weight of xylyl mercaptan, and 89.5% by weight of benzene.

The relative proportions of rubber and solvent used to make the cement depend upon the thickness of rubber desired to be deposited on the cords while the percentage of mercaptan or sulfide depends in a general way upon the amount of rubber used. In general the amount of rubber will range from 4% to 20%, the mercaptan or sulfide from 0.2% to 2%, and the solvent from 75% to 96%, all percentages being by weight of the cement. Any of the ordinary rubber solvents may be used and these include benzene, gasoline, carbon tetrachloride, and the like. It is, of course, not necessary that the rubber be applied to the fibrous material in the form of a cement as it may be calendered, or otherwise frictioned, on, if desired.

This invention is particularly applicable for treating tire cords prior to their use in tire construction and the like but it is also applicable for making any composite product comprising rubber with fibrous reinforcing elements. Although various specific details of the invention have been presented herein we do not wish to be limited by these but desire rather to claim the invention broadly within the spirit and scope of the appended claims.

We claim:

1. In a method of making a composite product comprising rubber and fibrous material in adhering relationship, the steps comprising coating the fibrous material with rubber containing a member of the class consisting of thiophenols and aromatic thioethers, associating the coated fibrous material with unvulcanized but vulcanizable rubber, and vulcanizing the rubber in the composite structure, whereby improved adhesion between the rubber and the fibrous material is obtained.

2. In a method of making a composite product comprising rubber and fibrous material in adhering relationship, the steps comprising coating the fibrous material with a thin layer of rubber containing a member of the class consisting of thiophenols and aromatic thioethers, associating the coated fibrous material with unvulcanized but vulcanizable rubber, and vulcanizing the rubber in the composite structure, whereby improved adhesion between the rubber and the fibrous material is obtained.

3. In a method of making a composite product comprising rubber and fibrous material in adhering relationship, the steps comprising coating the fibrous material with a liquid rubber composition containing a member of the class consisting of thiophenols and aromatic thioethers, associating the coated fibrous material with unvulcanized but vulcanizable rubber, and vulcanizing the rubber in the composite structure, whereby improved adhesion between the rubber and the fibrous material is obtained.

4. In a method of making a composite product comprising rubber and fibrous material in adhering relationship, the steps comprising coating the fibrous material with a thin layer of rubber containing a thiophenol, associating the coated fibrous material with unvulcanized but vulcanizable rubber, and vulcanizing the rubber in the composite structure, whereby improved adhesion between the rubber and fibrous material is obtained.

5. In a method of making a composite product comprising rubber and fibrous material in adhering relationship, the steps comprising coating the fibrous material with a liquid rubber composition containing a thiophenol, associating the coated fibrous material with unvulcanized but vulcanizable rubber, and vulcanizing the rubber in the composite structure, whereby improved adhesion between the rubber and the fibrous material is obtained.

6. In a method of making a composite product comprising rubber and fibrous material in adhering relationship, the steps comprising coating the fibrous material with a thin layer of rubber containing an aromatic thioether, associating the coated fibrous material with unvulcanized but vulcanizable rubber, and vulcanizing the rubber in the composite structure, whereby improved adhesion between the rubber and fibrous material is obtained.

7. In a method of making a composite product comprising rubber and fibrous material in adhering relationship, the steps comprising coating the fibrous material with a liquid rubber composition containing an aromatic thioether, associating the coated fibrous material with unvulcanized but vulcanizable rubber, and vulcanizing the rubber in the composite structure, where by improved adhesion between the rubber and the fibrous material is obtained.

8. In a method of making a composite product comprising rubber and fibrous material in adhering relationship, the steps comprising coating the fibrous material with a cement comprising rubber, a member of the class consisting of thiophenols and aromatic thioethers, and a solvent, evaporating substantially all the solvent, associating the coated fibrous material with unvulcanized but vulcanizable rubber, and vulcanizing the rubber in the composite structure, whereby improved adhesion between the rubber and the fibrous material is obtained.

9. In a method of making a composite product comprising rubber and fibrous material in adhering relationship, the steps comprising coating the fibrous material with a cement comprising rubber, a thiophenol, and a solvent, evaporating substantially all the solvent, associating the coated fibrous material with unvulcanized but vulcanizable rubber, and vulcanizing the rubber in the composite structure, whereby improved adhesion between the rubber and the fibrous material is obtained.

10. In a method of making a composite product comprising rubber and fibrous material in adhering relationship, the steps comprising coating the fibrous material with a cement comprising rubber, an aromatic thioether, and a solvent, evaporating substantially all the solvent, associating the coated fibrous material with unvulcanized but vulcanizable rubber, and vulcanizing the rubber in the composite structure, whereby improved adhesion between the rubber and the fibrous material is obtained.

11. A composite product comprising fibrous material, a layer of rubber containing a member of the class consisting of thiophenols and aromatic thioethers contiguous to the fibrous material, and a second layer of rubber contiguous to the first said layer.

12. A composite product comprising fibrous material, a layer of rubber containing a member of the class consisting of thiophenols and aromatic thioethers surrounding the fibrous material, and another layer of rubber surrounding the first said layer.

13. A composite product comprising fibrous material, a layer of rubber containing a thiophenol contiguous to the fibrous material, and another layer of rubber contiguous to the first said layer.

14. A composite product comprising fibrous material, a layer of rubber containing an aromatic thioether contiguous to the fibrous material, and another layer of rubber contiguous to the first said layer.

15. A composite product comprising cotton cord, a layer of rubber containing a thiophenol contiguous to the cord, and another layer of rubber contiguous to the first said layer.

16. A composite product comprising cotton cord, a layer of rubber containing an aromatic thioether contiguous to the cord, and another layer of rubber contiguous to the first said layer.

EDWARD T. LESSIG.
EDWARD N. CUNNINGHAM.